Patented Mar. 18, 1952

UNITED STATES PATENT OFFICE 2,589,459

PRODUCTION OF SURFACED CORE MATERIAL

Victor H. Turkington, Mountain Lakes, and Leon Shechter, East Orange, N. J., assignors, by mesne assignments, to Union Carbide and Carbon Corporation, a corporation of New York No Drawing. Application September 4, 1946,
Serial No. 694,826

7 Claims. (Cl. 154—95)

This invention relates primarily to laminated or sheet stock, particularly the surfacing of such stock, and to its manufacture. Laminates find extensive use for table and desk tops, decorative panels, wall boards and similar applications; and it is those applications with which the invention is mainly concerned.

Laminated stock consists of a core material, generally a plurality of plies bonded together, and a surface finish thereon provided in a pressing operation between heated platens. For the bonding and the surfacing, thermosetting resins of the phenolic and urea types are used with a preference for the latter for decorative surface finishes because of the absence of inherent color; alkyd resins made by reacting dibasic acids with glycerol are not practical for heat-setting on account of the extremely long heating periods required and the soft cures obtained. Urea resins, however, are markedly water-absorbent with a consequent tendency to crazing and dimensional instability. For these reasons the urea resins have been largely displaced by melamine resins; but these in turn are characterized by an egg-shell brittleness, particularly when pigmented, and by failure to withstand tests, such as the absence of crazing upon accelerated aging on heating in an oven at 95°–100° C.

The present invention rests on the discovery that an ester resin prepared by the reaction of a polyhydric alcohol with a diene monobasic acid, having conjugated double bonds and one of these in conjugation with the acidic carbonyl group, makes an excellent surfacing material on laminated stock as well as a bonding or adhesive layer for paper, cloth, etc. It can be had in white and pastel colors due to the absence of inherent color. Unlike the alkyd type it cures or hardens rapidly throughout the film thickness to a mar-proof, high-gloss surface with a depth of luster comparable to a piano finish; and the hardened surface has excellent resistance to organic solvents, soap solutions, fruit acids (citric, acetic, etc.) and boiling water including the "tea pot" test, as well as excellent craze and abrasion resistance. The surfacing is further characterized by good electrical properties, and particularly by a high arc resistance, that make laminated stock so surfaced desirable as electrical insulation.

For the preparation of ester resins, upon which this invention depends, the polyhydric alcohols include alkylene glycols and polyglycols, glycerols and polyglycerols, erythritol and pentaerythritol and their polymers, sorbitol, mannitol, trimethylol-propane, said alcohols all being polyhydroxyalkanes or polyhydroxyoxaalkanes. The acids comprise those having a straight hydrocarbon chain structure of from two to four conjugated ethylenic bonds, such as sorbic, β-vinyl-acrylic, octatrien-(2,4,6)-oic, decatetraen-(2,4,6,8)-oic, β-styryl-acrylic, etc., and a cross-conjugated chain structure, such as α-β-isopropylidene-propionic, α-vinyl-cinnamic, α-isopropenyl-furfural-acetic, α-isopropenyl-cinnamenyl-acrylic acids, etc. The preparation of the esters is preferably that of direct reaction at controlled temperatures (below 170° C.) in the presence of a volatile water-insoluble organic solvent forming an azeotropic mixture with water and of a strong acidic catalyst, particularly sulfuric acid, whereby it is found that esterification proceeds in preference to gelation that otherwise occurs to inhibit the ester formation; the reactants are usually proportioned to yield substantially complete esterification as shown by low acid numbers. The esters and their preparation form the subject matter of a copending application of Shechter, Serial No. 689,196, filed August 8, 1946, now Patent No. 2,462,337.

In the preparation of laminated stock, an ester resin as described permits a wide latitude in molding temperatures and pressures, and its versatility extends it to methods of application to sheet stock, such as dip-coating, roller-coating, stencil-spraying, block-printing and silk screen-printing. A preferred procedure for surfacing is that of coating a steel press plate by either spraying or printing and then transferring the coating to the surface of the laminate stock in the pressing operation.

The invention is illustrated by the following examples but not limited thereto.

Example 1

Four coats of glyceryl trisorbate in toluene solution were brushed on canvas duck, each coat being air-dried for 5 minutes before applying the next, and the coated canvas was placed in an oven heated to 116° C. for 3 minutes for further drying. Four plies of the treated canvas were stacked between outside covering layers of cellophane and tin plate, and weights equivalent to one pound per square inch were applied; the cellophane acts as a removable protecting sheet and serves also as a separating medium. The assembly was heated for 18 hours at 116° C. while under the applied weights. The product was a well-bonded laminate with a hard, mar-proof surface of excellent water and solvent resistance.

Example 2

Three coats of glycol sorbate in toluene were applied to glass cloth, each coat being dried for 3 minutes at 116° C. Four layers of the treated glass cloth were stacked and backed with cellophane and tin plate as before, and the stack was heated over-night at 116° C. under an applied pressure of one p. s. i. The final laminate was very hard.

Example 3

A glyceryl sorbate solution (68.5% in toluene) was applied to a paper sheet on which had been printed a green marble design; the treated paper was dried at about 102° C. for 6 minutes and it had a resin content of 60.2 per cent. A core material was assembled by stacking cloth sheeting that had been treated with a melamine resin, and on the core was laid a sheet of the treated paper with a cover sheet of cellophane. The assembly was pressed between platens at about 100 p. s. i. and a temperature of about 150° C. for about 30 minutes. A hard glossy surface resulted that gave no indication of being affected by boiling water, and exposure of the molded panel to weather showed no tendency to craze or to lose gloss.

Example 4

To 400 grams of a 50 per cent glyceryl sorbate solution in xylene were added 200 grams of titanium dioxide pigment and the mixture was ball-milled under carbon dioxide for 24 hours. To the mixture was added one per cent of lauroyl peroxide based on the sorbate and the mixture was sprayed on stainless steel plates to a film thickness of 5 mils and dried at 105° C. for 7 minutes; the resin film had set during the drying to the extent that when cool it was dry to the touch. A core stock was built from 10 sheets of paper impregnated with a heat-hardening phenol-formaldehyde resin, and a coated surface of one of the steel plates was placed in contact; the assembly was cured at a temperature of about 150° C. and a pressure of about 1200 p. s. i. for 30 minutes, these conditions being required for the curing of the phenol-formaldehyde bonding resin. The experiment was repeated a number of times with changes in curing temperatures varying from about 135° to 200° C., and all gave excellent hard and mar-proof surfaces resistant to ultra-violet light that remained perfect when tested for one hour in boiling water, showed no tendency to craze on heating over-night in an oven at 105° C., and responded without any evidence of crazing or marking to the "tea pot" test that consists in setting a vessel of boiling-hot water on the surface over which boiling water has been spilled. Prolonged and repeated cures accordingly have no apparent vitiating effects on the compositions, which in themselves cure at low temperatures and pressures, and a wide latitude in processing is thereby provided, such as printed designs in one or more colors with a background of another color and partially cured for transfer to a core to give inlay effects or the like.

In the foregoing examples, the setting of the resin ester is not that of continued esterification as with the alkyd resins; the esterification is substantially complete when the ester is applied and does not enter into the hardening or cross-linking. It seems to be a combination of two independent actions, one that of an opening upon heating of the double bonds, or a Diels-Alder polymerization, and the other the result of an oxidation or peroxide formation whereby in some unknown manner cross-linkages are formed; the combination of the two actions gives a fast accelerated hardening to a state having the properties noted.

What is claimed is:

1. Laminate comprising a core and a surfacing thereon of essentially a heat and oxygen hardenable resinous polyhydric alcohol ester of solely a diene monobasic acid having from two to four conjugated double bonds in the chain and one of these in conjugation with the acid carbonyl and a polyhydric alcohol selected from the group of polyhydroxyalkanes and polyhydroxyoxaalkanes, said surfacing being characterized by curing to a hard, lustrous finish resistant to organic solvents, soap solutions, fruit acids and boiling water.

2. Laminate comprising a core and a surfacing thereon of essentially heat and oxygen hardenable resinous glyceryl sorbate cured to a hard, lustrous finish resistant to organic solvents, soap solutions, fruit acids and boiling water.

3. Laminate comprising a core and a surfacing thereon of essentially heat and oxygen hardenable resinous glycol sorbate cured to a hard, lustrous finish resistant to organic solvents, soap solutions, fruit acids and boiling water.

4. Laminate comprising stacked layers of glass cloth and hardened resinous glycol sorbate as the binder for said cloth.

5. Laminate comprising a core and a surface film thereon of a hardened resinous polyhydric alcohol ester of solely a diene monobasic acid having from two to four conjugated double bonds in the chain and one of these in conjugation with the acid carbonyl and a polyhydric alcohol selected from the group of polyhydroxyalkanes and polyhydroxyoxaalkanes.

6. Process of making a surfaced core material which comprises filming on a surface a composition comprising a heat and oxygen hardenable resinous polyhydric alcohol ester of solely a diene monobasic acid having from two to four conjugated double bonds in the chain and one of these in conjugation with the acid carbonyl and a polyhydric alcohol selected from the group of polyhydroxyalkanes and polyhydroxyoxaalkanes, partially curing the film to a dry-to-touch state, removing the partially cured film from the surface by pressing the film into contact with the core to be surfaced, and completing the cure of the composition in contact with the core.

7. Process of making a laminate which comprises coating sheet stock with a composition comprising a heat and oxygen hardenable resinous polyhydric alcohol ester of solely a diene monobasic acid having from two to four conjugated double bonds in the chain and one of these in conjugation with the acid carbonyl and a polyhydric alcohol selected from the group of polyhydroxyalkanes and polyhydroxyoxaalkanes, partially curing the coating by air-drying and heating, and subjecting the coated sheet stock to heat and pressure for completing the cure.

VICTOR H. TURKINGTON.
LEON SHECHTER.

REFERENCES CITED

The following references are of record in the file of this patent:

UNITED STATES PATENTS

| Number | Name | Date |
|---|---|---|
| 2,010,857 | Hanson | Aug. 13, 1935 |
| 2,311,518 | Caligari | Feb. 16, 1943 |
| 2,311,613 | Slayter | Feb. 16, 1943 |
| 2,381,880 | Cupery | Aug. 14, 1945 |
| 2,462,337 | Shechter | Feb. 22, 1949 |

FOREIGN PATENTS

| Number | Country | Date |
|---|---|---|
| 795,616 | France | Jan. 8, 1936 |